United States Patent [19]
Lee

[11] Patent Number: 5,980,427
[45] Date of Patent: Nov. 9, 1999

[54] HYDRAULIC CONTROL SYSTEM FOR AUTOMATIC TRANSMISSIONS

[75] Inventor: Jinsoo Lee, Seoul, Rep. of Korea

[73] Assignee: Hyundai Motor Company, Seoul, Rep. of Korea

[21] Appl. No.: 08/974,313

[22] Filed: Nov. 19, 1997

[30] Foreign Application Priority Data

Nov. 19, 1996 [KR] Rep. of Korea ........................ 96-55079

[51] Int. Cl.[6] .................................................. F16H 61/26
[52] U.S. Cl. .......................... 477/158; 477/156; 475/120; 475/130
[58] Field of Search ..................................... 477/156, 158, 477/159, 160; 475/118, 127, 120, 122, 130

[56] References Cited

U.S. PATENT DOCUMENTS

| | | | |
|---|---|---|---|
| 5,213,013 | 5/1993 | Fujiwara et al. .......................... | 475/120 |
| 5,375,483 | 12/1994 | Kim et al. ............................ | 475/120 X |
| 5,409,427 | 4/1995 | Mori et al. ............................... | 475/120 |
| 5,662,550 | 9/1997 | Jang ........................................ | 477/130 |

FOREIGN PATENT DOCUMENTS 58-65355  4/1983  Japan ....................................... 475/120

*Primary Examiner*—Charles A Marmor
*Assistant Examiner*—Roger Pang

[57] ABSTRACT

Disclosed is a hydraulic control system including a hydraulic fluid source; line pressure control means for regulating hydraulic pressure supplied from the fluid source to line pressure; reducing pressure controller for reducing hydraulic pressure from the line pressure control means; range controller for selectively supplying hydraulic pressure from the line pressure controller; shift controller for supplying hydraulic pressure; hydraulic pressure controller for converting hydraulic pressure to operational pressure; and hydraulic pressure distributer for determining a hydraulic flow path according to the hydraulic pressure from the shift controller; wherein the hydraulic pressure distributer includes an end clutch valve supplying operational pressure to an end clutch; a low-reverse brake valve supplying operational pressure to a low-reverse brake; a first rear clutch valve supplying operational pressure to a rear clutch; a second rear clutch valve supplying hydraulic pressure to the first rear clutch valve; a 1-2 shift valve supplying hydraulic pressure to friction elements operating when 1-2 shifting; and a 2-3/4-3 shift valve supplying hydraulic pressure to friction elements operating when 2-3 and 4-3 shifting.

4 Claims, 9 Drawing Sheets

HYDRAULIC CONTROL SYSTEM FOR AUTOMATIC TRANSMISSIONS

FIELD OF THE INVENTION

The present invention relates to a hydraulic control system for a four-speed automatic transmission, and more particularly, to a hydraulic control system for automatic transmissions in which hydraulic pressure supplied to friction elements is controlled by solenoid valves to improve shift response and shift quality.

BACKGROUND OF THE INVENTION

Conventional automatic transmissions used in vehicles include a torque converter, a multi-stage gear shift mechanism connected to the torque converter, and a plurality of friction elements actuated by hydraulic pressure for selecting one of the gear stages of the gear shift mechanism.

A hydraulic control system for controlling the automatic transmission operates by selectively supplying hydraulic pressure, the flow of which is generated by a hydraulic pump, to engage or disengage each friction element by a plurality of control valves such that shifting can be performed automatically and appropriately for the driving state of the vehicle.

Such hydraulic control systems generally comprise a pressure regulating controller for controlling the hydraulic pressure generated by the hydraulic pump, manual and automatic shift controllers for selecting a shift mode, a hydraulic pressure controller for controlling shift quality and shift response, a damper clutch controller for actuating a damper clutch of the torque converter, and a hydraulic pressure distributor for supplying an appropriate amount of hydraulic pressure to each of the friction element.

The torque converter includes an impeller connected to an output shaft of an engine so as to be rotated thereby, a turbine splined to a transmission input shaft, and a stator disposed between the impeller and the turbine which redirects fluid flow back to the same direction as impeller rotation to assist impeller rotation.

Automatic shifting is realized by changing shift ratios in a planetary gearset by selectively operating friction elements corresponding to each shift range. The friction elements are selectively operated by the changing of the flow of hydraulic pressure thereto using the plurality of valves of the hydraulic control system. The valves receive hydraulic pressure through a manual valve which is indexed with a selector lever operated by the driver to realize port conversion. Further, through the ON/OFF and duty control of solenoid valves by a transmission control unit (TCU), hydraulic pressure distribution by the hydraulic pressure distributor is changed and friction elements are selectively operated thereby, realizing the control of shift stages.

However, in such a conventional hydraulic control system, shift shock is most severe when shifting into a drive D range after reversing, where a drive D2 creep state initially occurs before the accelerator is depressed by the driver. The shift shock is caused by the friction elements interlocking the friction elements in the drive D2 creep state.

SUMMARY OF THE INVENTION

The present invention has been made to solve the above problems.

It is an object of the present invention to provide a hydraulic control system for automatic transmissions which reduces shift shock when shifting into a drive D range after reversing, and which provides an additional solenoid valve to precisely control engagement of friction elements to improve shift responsiveness and shift quality.

To achieve the above object a hydraulic control system is provided including a plurality of friction elements associated with respective transmission speeds; the hydraulic control system comprises a hydraulic fluid source; line pressure control means for regulating hydraulic pressure supplied from the fluid source to line pressure; reducing pressure control means for reducing hydraulic pressure from the line pressure control means; range control means for selectively supplying hydraulic pressure from the line pressure control means; shift control means for supplying hydraulic pressure from the range control means to lines corresponding to the respective transmission speeds by control of a transmission control unit; hydraulic pressure control means for converting hydraulic pressure from the range control means to operational pressure operating the friction elements; and hydraulic pressure distributing means for determining a hydraulic flow path corresponding to the respective transmission speeds according to the hydraulic pressure from the shift control means, and suitably distributing the operational pressure to each friction element; wherein the hydraulic pressure distributing means further comprises an end clutch valve supplying operational pressure to an end clutch; a low-reverse brake valve supplying operational pressure to a low-reverse brake; a first rear clutch valve supplying operational pressure to a rear clutch; a second rear clutch valve supplying hydraulic pressure to the first rear clutch valve; a 1-2 shift valve supplying hydraulic pressure to friction elements operating when 1-2 shifting; and a 2-3/4-3 shift valve supplying hydraulic pressure to friction elements operating when 2-3 and 4-3 shifting.

According to a feature of the present invention, the shift control means comprises a first shift control valve controlling hydraulic pressure supplied from the range control means to second, third, and fourth speed pressures; a second shift control valve additionally supplying the hydraulic pressure supplied from the range control means to the hydraulic pressure distributing means to control timing of hydraulic pressure from the hydraulic pressure distributing means to each friction element and reduce variations in hydraulic pressure levels; and a solenoid valve controlling the second shift control valve according to control from a transmission control unit.

According to another feature of the present invention, the low-reverse brake valve includes a port for supplying hydraulic pressure to a low-reverse brake, a port hydraulic pressure from the 1-2 shift valve to the low-reverse brake; and a port for receiving hydraulic pressure from the range control means to control a valve spool of the low-reverse brake valve.

According to still yet another feature of the present invention, the second rear clutch valve includes a port communicating with the first rear clutch valve to receive hydraulic pressure from the same, a port for receiving hydraulic pressure from the hydraulic pressure control means, and a port communicating with the range control means to receive hydraulic pressure for operating a valve spool of the second rear clutch valve.

According to still yet another feature of the present invention, the second shift control valve includes a port receiving hydraulic pressure from the second shift control valve, a port receiving hydraulic pressure from the range control means, and a port communicating with the solenoid valve controlling the second shift control valve, and which receives hydraulic pressure to control a valve spool of the second shift control valve.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
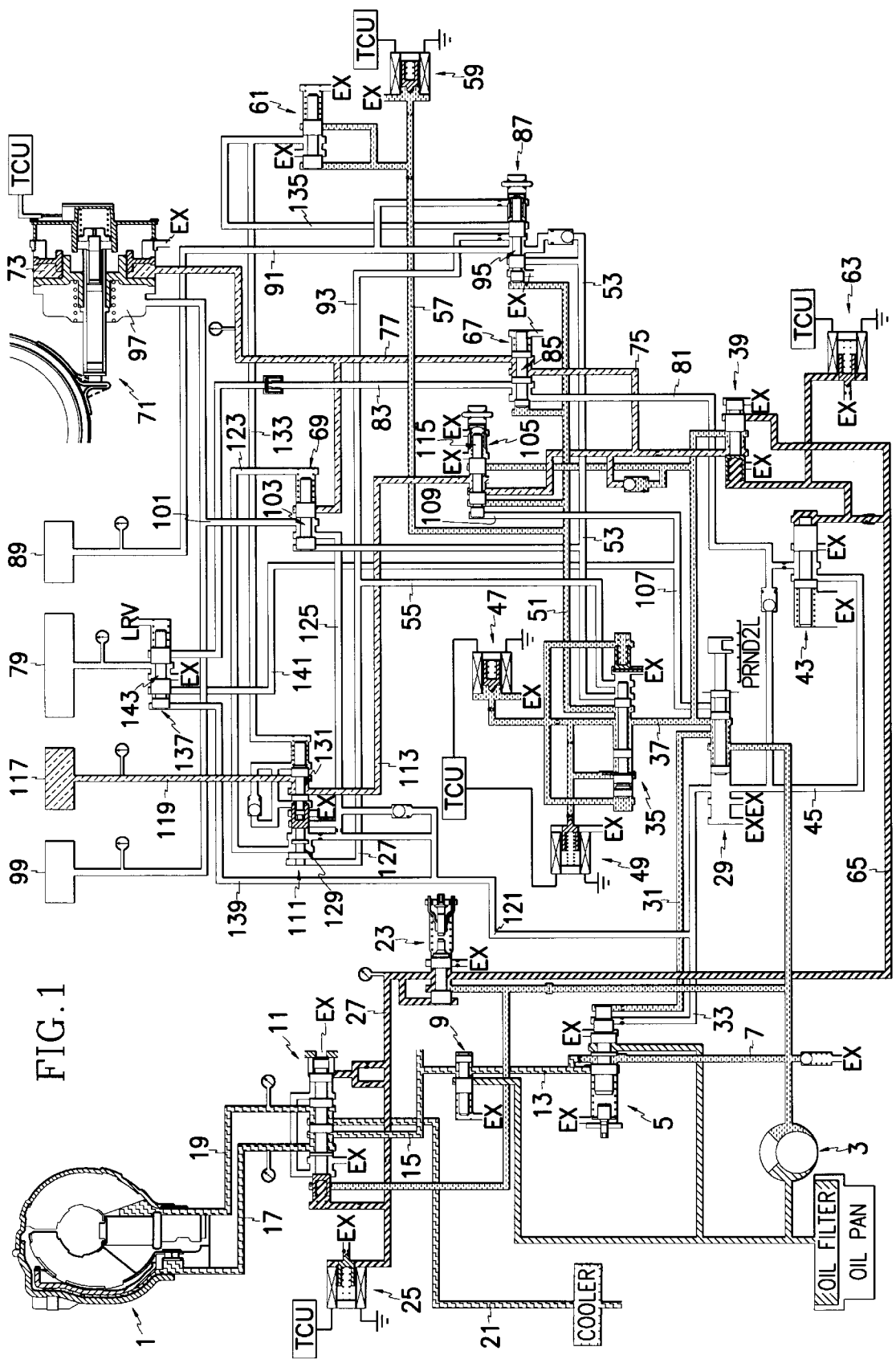
FIG. 1 is a hydraulic circuit diagram (during N-D2 shifting, realized by first passing a D1 speed) of a hydraulic control system according to a preferred embodiment of the present invention.

Preferred embodiments of the present invention will now be described in detail with reference to the accompanying drawings.

Certain terminology will be used in the following description for convenience and reference only and is not meant to be structurally limiting. The words "right" and "left" will designate directions in the drawings to which reference is made.

Referring first to FIG. 1, there is shown a hydraulic circuit diagram during N-D2 shifting of a hydraulic control system according to a preferred embodiment of the present invention. The hydraulic control system is structured such that hydraulic pressure created by hydraulic pressure generating means is selectively supplied to/released from each friction element to engage/disengage the same, thereby realizing automatic shifting.

In more detail, an oil pump 3, mounted to a pump drive hub of a torque converter 1, is connected to a line pressure passage 7 to supply hydraulic pressure to a regulator valve 5.

The regulator valve 5 supplies hydraulic pressure supplied through the line pressure passage 7 to a torque converter control valve 9, a damper clutch control valve 11, and the torque converter 1 through lines 13, 15, 17, 19, and 21, such that a lubrication portion of a transaxle and a damper clutch, mounted in the torque converter 1, are controlled.

A reducing valve 23, connected to the line pressure passage 7 and receiving line pressure controlled in the regulator valve 5, is connected to a line 27 such that reduced pressure can be supplied to a damper clutch control solenoid valve 25 which controls the damper clutch according to signals from a transmission control unit (TCU).

Hydraulic pressure in the line pressure passage 7 is supplied to the torque converter 1 through the damper clutch control valve 11, the damper clutch control valve 11 being controlled by the damper clutch control solenoid valve 25.

Further, the line pressure passage 7 is connected to a manual valve 29, indexed by a shift select lever (not shown) to determine shift ranges by controlling hydraulic flow. The shift ranges of the manual valve 29 include parking P, reverse R, neutral N, and drive D, 2, and L ranges.

The manual valve 29 hydraulic pressure to be supplied to a regulator valve 5 when drive and reverse (D,2,L and R) ranges are selected, and is connected to lines 31 and 33 to control hydraulic pressure to suitable line pressure levels for each range.

In addition, the manual valve 29 is connected to a first shift control valve 35 via a line 37, to a pressure control valve 39 via a line 41, and an N-R control valve 43 via a line 45 to allow the supply and exhaust of hydraulic pressure to and from elements controlling shifting and hydraulic pressure.

The first shift control valve 35 supplies/exhaust second, third, and fourth speed pressures respectively to second, third, and fourth speed lines 51, 53, and 55 by first and second shift control solenoid valves 47 and 49 ON/OFF operated according to control signals from the TCU.

A second shift control valve 61, controlled by a third shift control solenoid valve 59, is connected to a line 57 extended from the second speed pressure line 51.

The hydraulic pressure control valve 39 and the N-R control valve 43 are both connected to a line 65 to allow supply of reduced pressure from the reducing valve 23, and control by the pressure control solenoid valve 63.

A hydraulic pressure distributor is provided between friction elements and a hydraulic pressure controller comprising the hydraulic pressure control valve 39 and the N-R control valve. The hydraulic pressure distributor is controlled by the first and second shift control valves 35 and 61, and supplies suitable levels of hydraulic pressure to friction elements for each shift range.

The hydraulic pressure distributor comprises a 1-2 shift valve 67, a 2-3/4-3 shift valve 69, an end clutch valve 87, and first and second rear clutch valves 111 and 105. The 1-2 shift valve 67 is connected to the second speed pressure line 51 to be controlled by pressure from the same, to lines 75 and 77 to allow supply of hydraulic pressure supplied from the pressure control valve 39 to the 2-3/4-3 shift valve 69 and a servo apply 73 of a kickdown band brake 71, and to lines 81 and 83 such that hydraulic pressure from the N-R control valve 43 is fed to a low-reverse brake 79. The 1-2 shift valve 67 includes a valve spool 85 to enable the above port-conversion control.

The end clutch valve 87 is connected to the second and third speed lines 51 and 53 and is controlled by second speed pressure. Also connected to the end clutch valve 87 are a line 91 for supply/release of third speed pressure from an end clutch 89, and a line branched off from the fourth speed line 55. A valve spool 95 is disposed in the end clutch valve 87 enabling the supply of pressure to the line 91 as fail-safe means.

The 2-3/4-3 shift valve 69 is connected to the third speed line 53 to be controlled by pressure from the same, and to a line 101 such that hydraulic pressure supplied to the line 77 is fed to a servo release 97 of the kickdown band brake 71 and a front clutch 99. The 2-3/4-3 shift valve 69 includes a valve spool 103 to enable the above control.

The second rear clutch valve 105 receives hydraulic pressure from a line 109, branched off from a line 107 connected to the manual valve 29, when the low L range is selected, and is connected to the second pressure line 51 to be controlled from pressure from the same. The second rear clutch valve 105 is further connected to a line 113 to selectively supply hydraulic pressure received from the lines 75 and 41 to a first rear clutch valve 111. Disposed in the second rear clutch valve 105 is a valve spool 115 for enabling the above control.

The above first rear clutch valve 111 is connected to a line 119 for supply of hydraulic pressure from the second rear clutch valve 105 to a rear clutch 117; to lines 121, 123, and 125 to supply hydraulic pressure supplied to the manual valve to the 2-3/4-3 shift valve 69 when reversing to control the same; and to a line 127 branched off from the fourth speed line 55. The first rear clutch valve 111 includes first and second valve spools 129 and 131 enabling hydraulic pressure supplied to the rear clutch 117 to be exhausted when in a fourth speed of the drive D range.

Further, the first rear clutch valve 111 is connected to the second shift control valve 61 via a line 133 such that hydraulic pressure supplied to the line 57 branched off from the second speed pressure line 51 is supplied to the second shift control valve 61 via the line 133 to enable control of the second valve spool 131 according to third shift control solenoid valve 59 control.

The second shift control valve 61 is connected to a line 135. To enable the simultaneous control of the first second rear clutch valve 111 and the valve spool 95 of the end clutch valve 87.

A low-reverse brake valve 137 is provided on the line 83 connecting the 1-2 shift valve 85 to the low-reverse brake 79, the low-reverse brake valve 137 controlling hydraulic pressure supplied to and exhausted from the line 83.

The low-reverse brake valve 137 is connected to a line 139 branched off from the line 121 and to a line 141 branched off from the line 107, and includes a valve spool 143 controlled by hydraulic pressure supplied from the lines 139 and 141 such that hydraulic pressure from the line 83 is supplied to the low-reverse brake 79.

The above damper clutch control solenoid valve 25, first and second shift control solenoid valves 47 and 49, and the pressure control solenoid valve 63 are normally closed solenoid valves and, therefore, pressure is controlled to high when the above valves are not activated. However, the third shift control solenoid valve 59 is open such that pressure is controlled to low when the valve is not activated.

In the hydraulic control system structured as in the above, automatic shifting is realized by the operation of the manual valve 29 and the ON/OFF and duty control of each solenoid valve by the TCU according to vehicle speed and throttle opening.

First, when the vehicle engine is started, hydraulic pressure generated by the oil pump 3 is controlled to a predetermined level in the regulator valve 5 then supplied to the line pressure passage 7 and, at the same time, to the torque converter control valve 9.

Also, the TCU performs control such that the reduced pressure supplied from the reducing valve 23 is operated/ non-operated by ON/OFF controlling the damper clutch control solenoid valve 25 to control the damper clutch control valve 11, and engages/disengages the damper clutch by supplying/exhausting hydraulic pressure to fro the lines 17 and 19.

(N-D2 Shifting)

From the neutral N range, if the shift select lever is positioned at the drive D range by the driver, hydraulic flow occurs as shown in FIG. 1. Namely, the manual valve 29 undergoes port conversion such that hydraulic pressure supplied to the line pressure passage 7 is supplied to the lines 37 and 41.

Simultaneously with the above, the TCU duty controls the pressure control solenoid valve 63 to engage the pressure control valve 39. Accordingly, hydraulic pressure supplied to the line 41 is duty controlled and supplied to the line 75, and to the rear clutch 117 via the lines 75, 113, and 119, communicated to the line 41 through the second rear clutch valve 105 and the first rear clutch valve 111.

Further, the TCU controls the first, second and third shift control solenoid valves 47, 49 and 59 such that hydraulic pressure is supplied to the second pressure line 51 of the first shift control valve 35.

Hydraulic pressure supplied to the second pressure line 51 is supplied to the 1-2 shift valve 67 to move the valve spool 85 of the same to the right such that communication with the lines 75 and 77 is realized, and, at the same time, the pressure is supplied to the second rear clutch valve 105 to move the valve spool 115 of the same to the right to enable communication with the lines 75 and 113.

Accordingly, flow of the hydraulic pressure supplied to the line 75 is cut off by the second rear clutch valve 105, and hydraulic pressure supplied to the line 41 to fed to the lines 113 and 119 via the second rear clutch valve 105 to operate the rear clutch, realizing shifting into the first speed of the drive D range, or D1.

Together with the above, hydraulic pressure controlled by the pressure control valve 39 is supplied to the servo apply 73 through the lines 75 and 77, communicating via the 1-2 shift valve 67, such that the kickdown band brake 71 is operated, to realize a D2 creep state.

As the D2 creep state is realized after shifting first into the D1 speed, the rear clutch 117 is controlled by the second rear clutch valve 105 as hydraulic pressure in the servo release 97 is exhausted through an orifice.

(1-2 Shifting)

Figure 2:
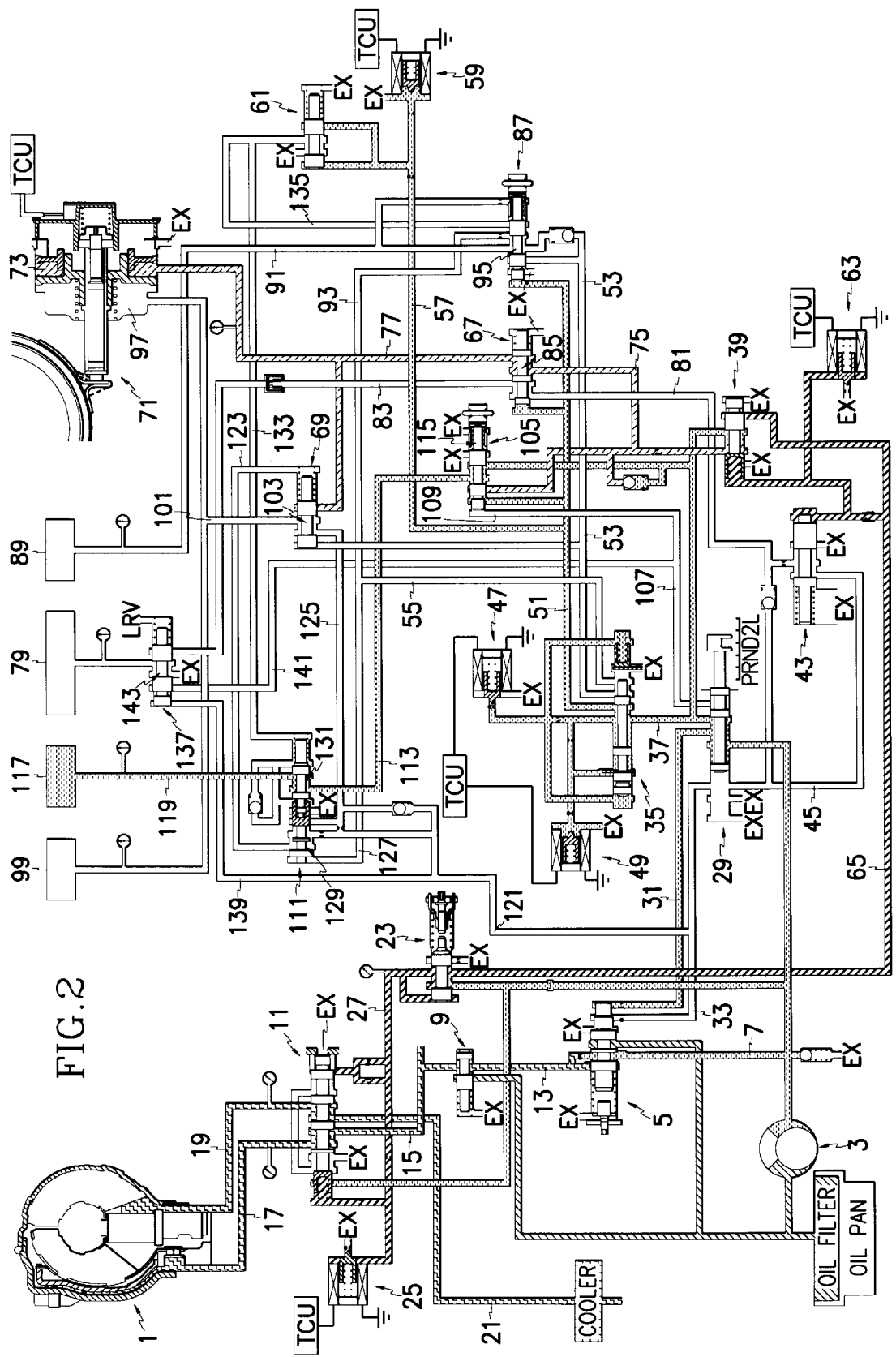
FIG. 2 is a hydraulic circuit diagram (during 1-2 shifting) of a hydraulic control system according to a preferred embodiment of the present invention.

Referring to FIG. 2, shown is a hydraulic circuit diagram during 1-2 shifting of a hydraulic control system according to a preferred embodiment of the present invention. When the manual valve 29 is positioned at the drive D range, when vehicle speed and throttle opening are increased in the first speed of the drive D range, control is realized as shown in FIG. 2.

In a state where the rear clutch 117 is operating, the TCU controls the first, second and third shift control solenoid valves 47, 49 and 59 such that hydraulic pressure is supplied from the first shift control valve 35 to the second speed pressure line 51.

The hydraulic pressure supplied from the second speed pressure line 51 is fed to the 1-2 shift valve 67 such that the valve spool 85 of the same is moved to the right to communicate the lines 75 and 77, is fed to the second rear clutch valve 105 to move the valve spool 115 of the same to the right to communicate the line 113, connected to the line 75, to the line 41. Accordingly, the rear clutch 117 is continuously operated by the hydraulic pressure supplied from the line 41.

Simultaneously with the above, the TCU duty controls the pressure control solenoid valve 63 to operate the pressure control valve 39. As a result, hydraulic pressure supplied to the line 41 is duty controlled and supplied to the servo apply 73 through the lines 75 and 77 to operate the kickdown band brake 71, realizing shifting into the second speed of the drive D range.

(2-3 Shifting)

Figure 3:
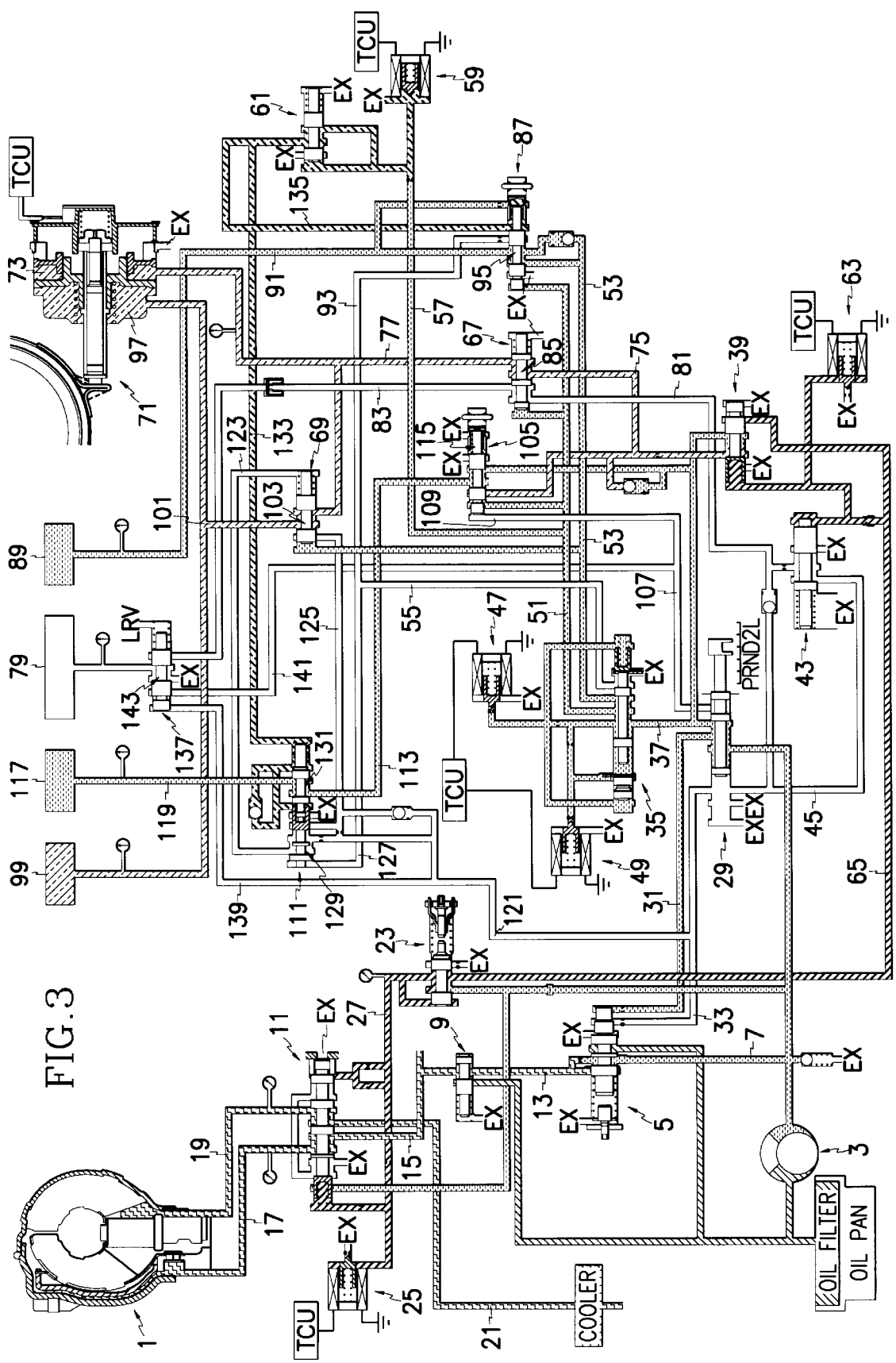
FIG. 3 is a hydraulic circuit diagram (during 2-3 shifting) of a hydraulic control system according to a preferred embodiment of the present invention.

If vehicle speed and throttle opening are increased in the second speed state, control is realized as shown in FIG. 3.

Namely, in a state where the rear clutch 117 is operating, the TCU controls the first and second shift control solenoid valves 47 and 49 such that hydraulic pressure is supplied from the first shift control valve 35 to the second and third speed pressure lines 51 and 53.

The third speed pressure supplied to the third speed pressure line 53 is supplied to the 2-3/4-3 shift valve 69 to move the valve spool 103 of the same to the right such that the lines 77 and 101 are communicated.

Simultaneously with the above, the TCU duty controls the pressure control solenoid valve 63 to operate the pressure control valve 39. As a result, hydraulic pressure supplied to the line 41 is duty controlled and supplied to the servo apply 73 through the lines 75 and 77, and supplied to the servo release 97 and the front clutch 99 through the lines 77 and 101, communicated through the 2-3/4-3 shift valve 69, such that the kickdown band brake 71 is released and the front clutch 99 is operated, to realize shifting into the third speed of the drive D range.

After the above shifting, the TCU duty controls the third shift control solenoid valve 59 such that hydraulic pressure supplied to the line 57, branched off from the second speed pressure line 51, is applied to the second shift control valve 61 to operate the same. Accordingly, the lines 57, 133, and 135 are mutually communicated.

Accordingly, hydraulic pressure supplied to the line 135 moves the valve spool 95 of the end clutch valve 87 to the left such that hydraulic pressure supplied to the third speed pressure line 53 is fed to the line 91 to operate the end clutch 89, then hydraulic pressure supplied to the lines 133 and 135 is exhausted through the second shift control valve 61.

(3-4 Shifting)

Figure 4:
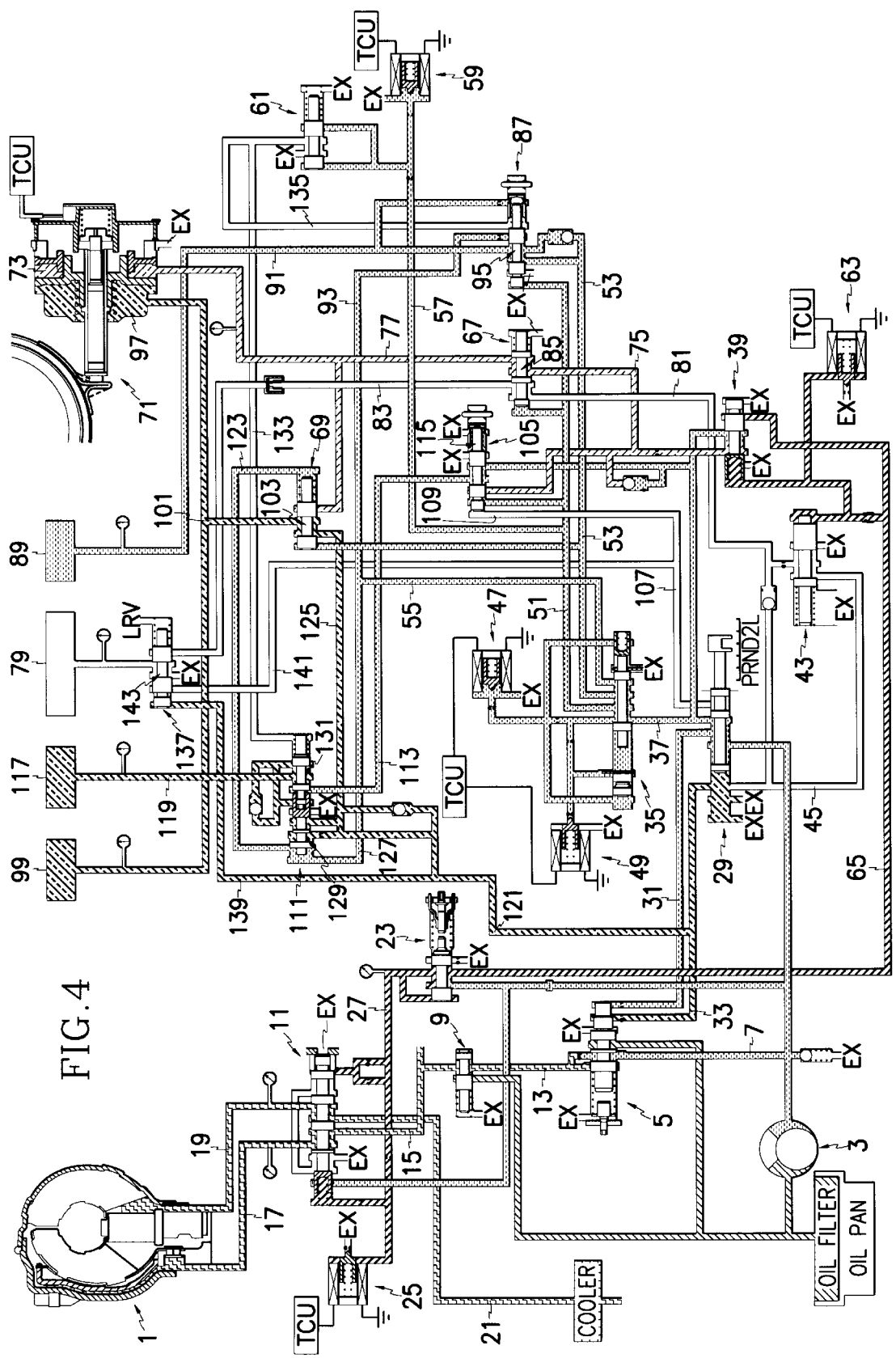
FIG. 4 is a hydraulic circuit diagram (during 3-4 shifting) of a hydraulic control system according to a preferred embodiment of the present invention.

If vehicle speed and throttle opening are increased in the second speed state, control is realized as shown in FIG. 4. Namely, in a state where the end clutch 89 is operating, the TCU controls the first, second and third shift control solenoid valves 47, 49 and 59 such that hydraulic pressure is supplied from the first shift control valve 35 to the second, third, and fourth speed pressure lines 51, 53, and 55.

The hydraulic pressure supplied to the second and third speed pressure lines 51 and 53 operates as in the third speed, while the fourth speed pressure supplied to the fourth speed pressure line 55 is supplied to the end clutch valve 87 via the line 93 such that hydraulic pressure is continuously supplied to end clutch 89 of the end clutch valve 87. Also, the hydraulic pressure is supplied to the first second rear clutch valve 111 via the line to move the valve spools 129 and 131 of the first rear clutch valve 111 to the right such that the lines 127 and 123 are connected, while the connection between the lines 113 and 119 is cut off.

The fourth speed pressure fed to the communicated lines 127 and 123 is supplied to the 2-3/4-3 shift valve 69 to move the valve spool 103 of the same to the left such that the lines 101 and 125 are communicated, while the communication between the lines 77 and 101 is blocked.

Accordingly, the hydraulic pressure operating the rear clutch 117 is exhausted through the line 119 and the first rear clutch valve 111, and the hydraulic pressure supplied to the front clutch 99 and the servo release 97 is exhausted through the manual valve 29 via the lines 125 and 121, in which there are disposed orifices, such that the rear clutch 117 and the front clutch 99 are disengaged.

Simultaneously with the above, the TCU duty controls the pressure control solenoid valve 63 to operate the pressure control valve 39. As a result, hydraulic pressure supplied to the line 41 is supplied to the servo apply 73 through the lines 75 and 77, communicated through the 1-2 shift valve 67, such that the kickdown band brake 71 is engaged, realizing shifting into the fourth speed of the drive D range.

(4-3 Shifting)

Figure 5:
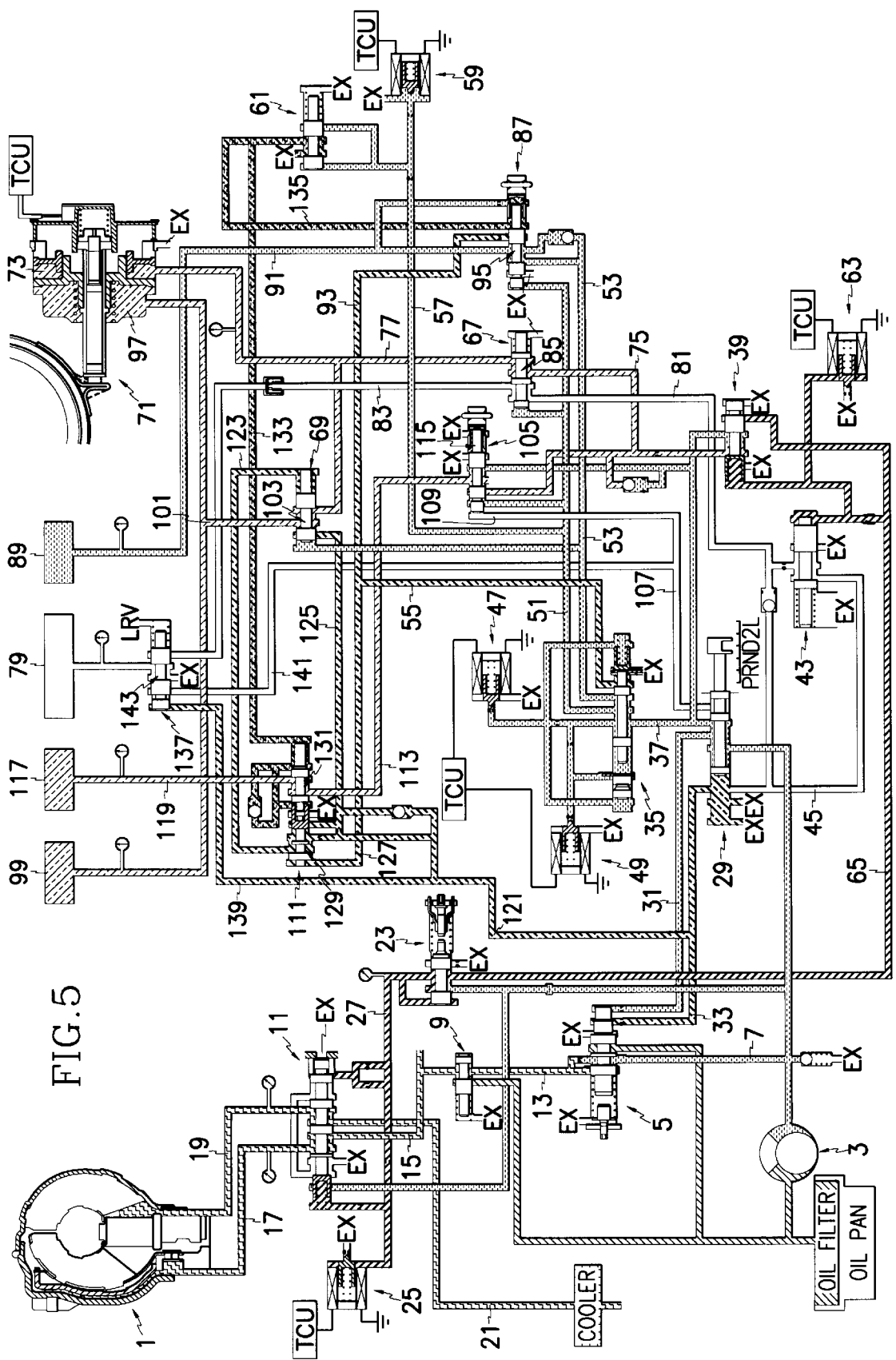
FIG. 5 is a hydraulic circuit diagram (during 4-3 shifting) of a hydraulic control system according to a preferred embodiment of the present invention.

In the above fourth speed state, if vehicle speed and throttle opening are reduced, control is realized as shown in FIG. 5. Namely, in a state where the end clutch 89 is operating, the TCU controls the first and second shift control solenoid valves 47 and 49 such that hydraulic pressure supplied to the fourth speed pressure line 55 from the first shift control valve 35 is cut off.

Accordingly, pressure supplied to the lines 127, 93, and 55 is exhausted through the first shift control valve 35, and, as a result, the first valve spool 129 of the first second rear clutch valve 111 is moved to the left and the hydraulic pressure supplied to the line 123 is exhausted through the manual valve 29 after passing through the line 121.

Here, the TCU controls the third shift control solenoid valve 59 to operate the second shift control valve 61. Accordingly, hydraulic pressure supplied to the line 57 is fed to the line 133 such that the second valve spool 131 of the first rear clutch valve 111 is moved to the left.

In the above state, the TCU controls the pressure control solenoid valve 63 to operate the pressure control valve 39 such that hydraulic pressure is supplier to the servo apply 73 and the servo release 97 through the lines 41, 75, and 77 and the line 101, all communicating with the pressure control valve 39, and hydraulic pressure is supplied to the front clutch 99 to operate the same.

Simultaneously with the above, hydraulic pressure is supplied to the rear clutch 117 through the lines 75 and 113, communicated through the second rear clutch valve 105, and the lines 113 and 119, communicated through the first second rear clutch valve 111, such that the rear clutch 117 is operated to realize shifting into the third speed.

After the above, the TCU controls the third shift control solenoid valve 59 to release the hydraulic pressure, through the line 133 connected to the second shift control valve 61, operating on a right side of the second valve spool 131 of the first second rear clutch valve 11.

(3-2 Shifting)

Figure 6:
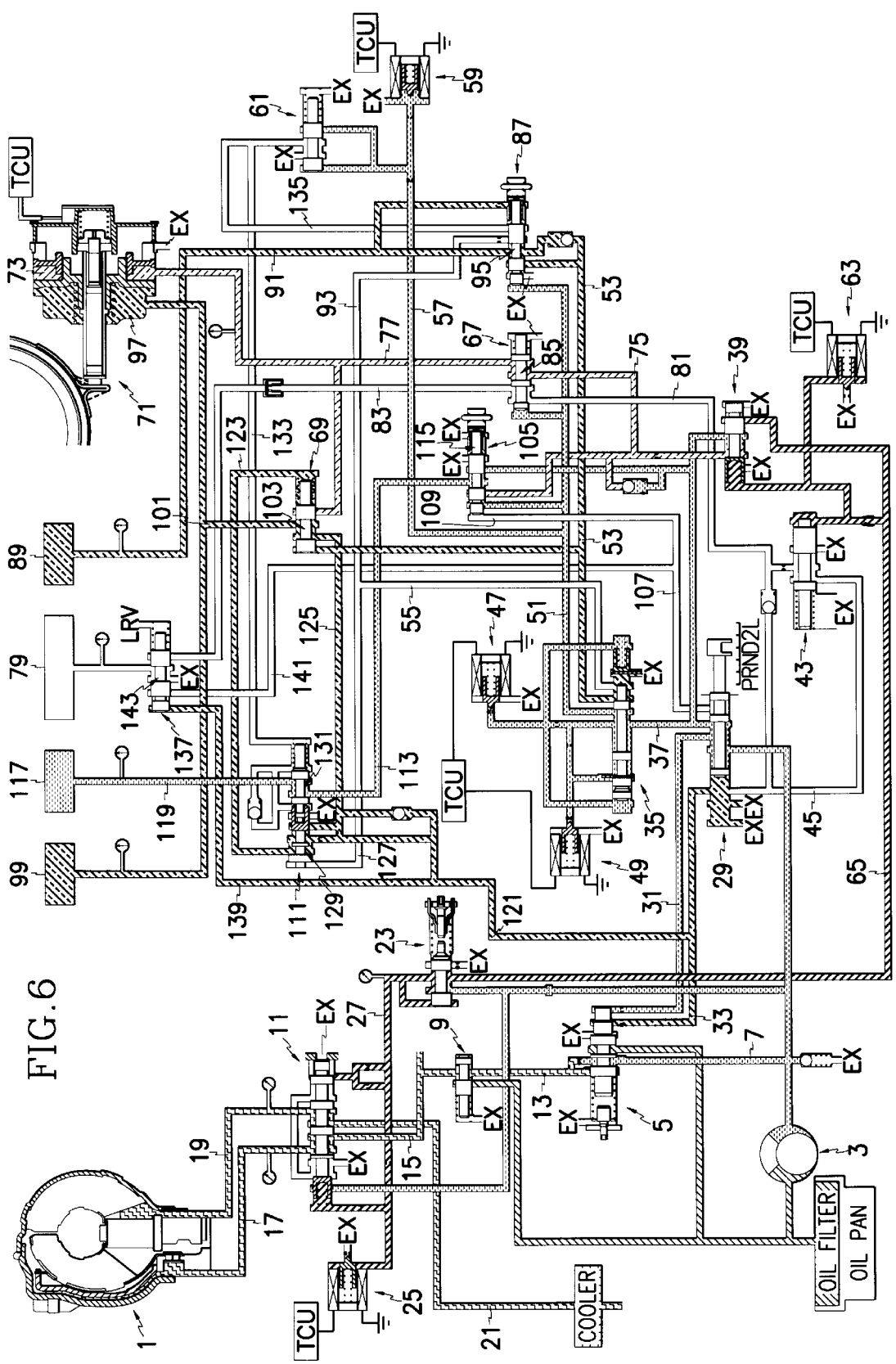
FIG. 6 is a hydraulic circuit diagram (during 3-2 shifting) of a hydraulic control system according to a preferred embodiment of the present invention.

In the above third speed state, if vehicle speed and throttle opening are reduced, control is realized as shown in FIG. 6. Namely, in a state where the rear clutch 117 is operating, the TCU controls the first, second and third shift control solenoid valves 47, 49 and 59 such that hydraulic pressure supplied to the third speed pressure line 55 from the first shift control valve 35 is cut off.

Accordingly, pressure supplied to the line 53 is exhausted through the first shift control valve 35, and, as a result, the valve spool 103 of the 2-3/4-3 shift valve 69 is moved to the left to cut off the lines 77 and 101 and communicate the lines 101 and 125.

As a result, the hydraulic pressure operating the front clutch 99 and the servo release 97 is exhausted through the manual valve 29 after passing through the lines 101 and 125 and the line 121 provided with an orifice.

Also, the hydraulic pressure operating the end clutch 89 is exhausted through the lines 91 and 53, communicated through the end clutch valve 87, and the first shift control valve 35 to disengage the end clutch 89. The valve spool 95 of the end clutch valve 87 is moved to the right by second speed pressure.

Here, the TCU controls the pressure control solenoid valve 63 such that the pressure control valve 39 is operated and hydraulic pressure is supplied to the servo apply 73 via the lines 41, 75, and 77, communicated through the 1-2 shift valve 67, to engage the kickdown band brake 71, realizing shifting into the second speed.

(2-1 Shifting)

Figure 7:
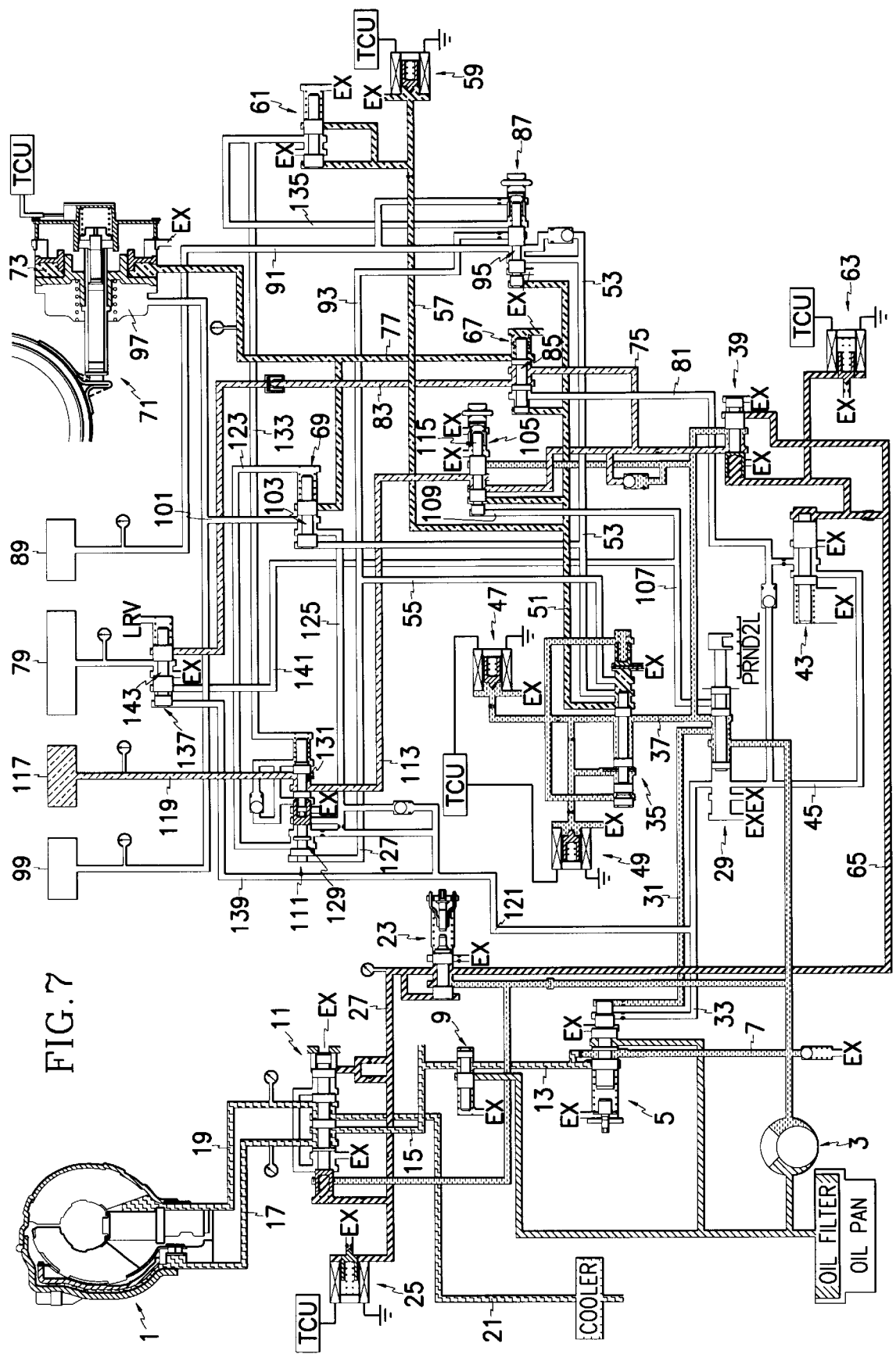
FIG. 7 is a hydraulic circuit diagram (during 2-1 shifting) of a hydraulic control system according to a preferred embodiment of the present invention.

In the above second speed state, if vehicle speed and throttle opening are reduced, control is realized as shown in FIG. 7. Namely, in a state where the rear clutch 117 is operating, the TCU controls the first, second and third shift control solenoid valves 47, 49 and 59 such that hydraulic pressure supplied to the second speed pressure line 51 from the first shift control valve 35 is cut off.

Accordingly, pressure supplied to the line 51 and the line 57, branched off from the line 51, is exhausted through the first shift control valve 35. As a result, the valve spool 85 of the 1-2 shift valve 67 and the valve spool 95 of the end clutch valve 87 are moved to the left to cut off the lines 75 and 77 such that the hydraulic pressure operating on the servo apply 73 is exhausted through the 1-2 shift valve 67, connected to the line 77, to disengage the kickdown band brake 71.

Also, according to the release of second speed pressure, the valve spool 115 of the second rear clutch valve 105 is moved to the left to cut off the lines 41 and 113, communicate the lines 113 and 75, and supply hydraulic pressure controlled in the pressure control valve 39 through the lines 113 and 119, communicated through the first rear clutch valve 111, to continuously engage the rear clutch 117, realizing shifting into the first speed of the drive D range.

(D2-L Shifting)

Figure 8:
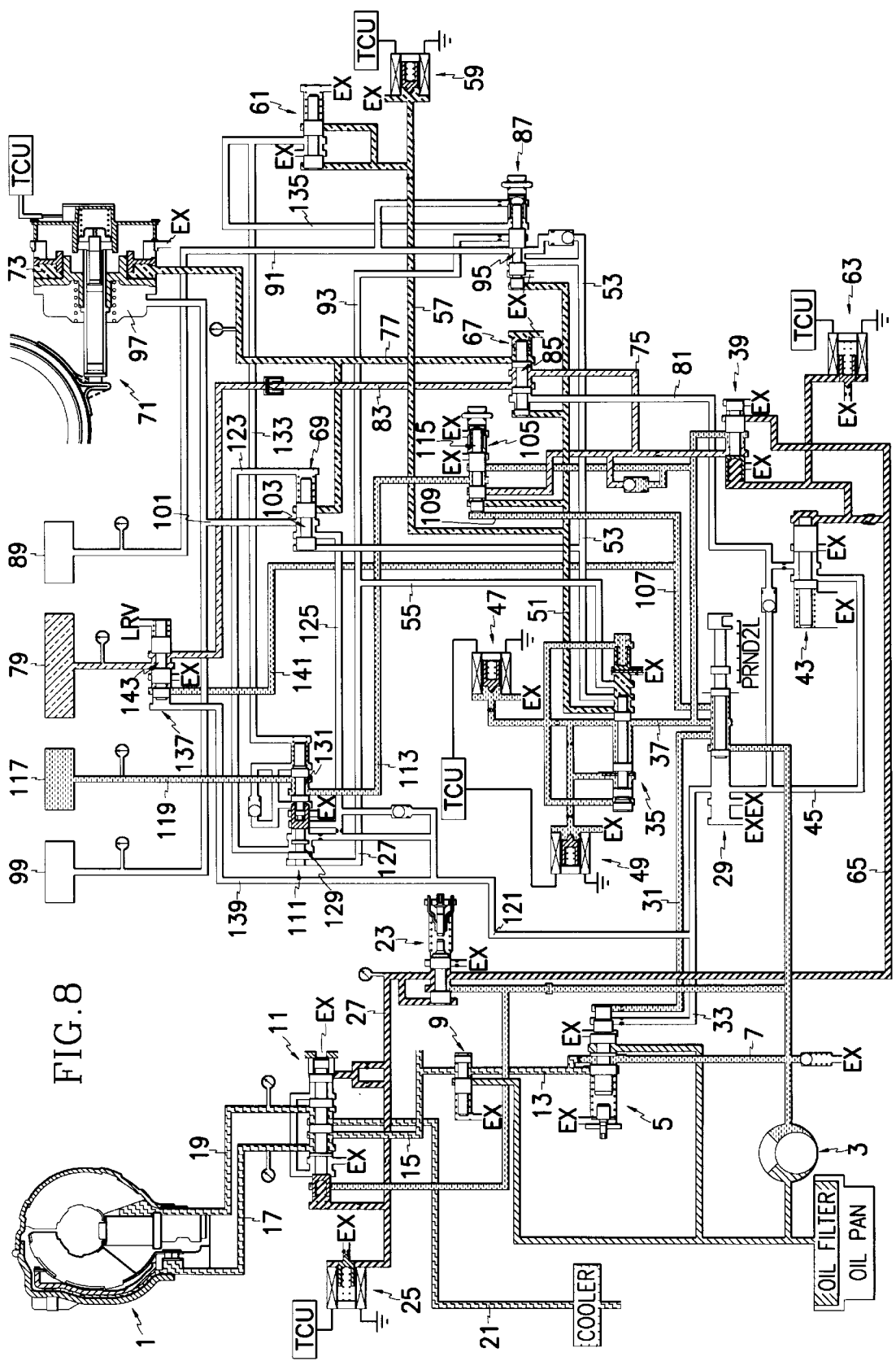
FIG. 8 is a hydraulic circuit diagram (during D2-L shifting) of a hydraulic control system according to a preferred embodiment of the present invention.

In the previously-described second speed state of the drive D range, if the shift select lever is positioned by the user at the low L range, control is realized as shown in FIG. 8. Namely, the manual valve 29 realizes port conversion such that hydraulic pressure supplied to the line pressure passage 7 is fed to the lines 37 and 41, and the line 107.

Accordingly, hydraulic pressure supplied to the line 141, branched off from the line 107, moves the valve spool 143 of the low-reverse brake valve 137 to the right to communicate the line 83 with the low-reverse brake 79.

Also, in a state where the rear clutch 117 is engaged, the TCU controls the first, second and third shift control solenoid valves 47, 49 and 59 such that hydraulic pressure supplied to the second speed pressure line 51 from the first shift control valve 35 is cut off.

Accordingly, pressure supplied to the line 51 and the line 57, branched off from the line 51, is exhausted through the first shift control valve 35. As a result, the valve spool 85 of the 1-2 shift valve 67 and the valve spool 95 of the end clutch valve 87 are moved to the left to cut off the connection between the lines 75 and 77, and communicate the lines 75 and 83.

Further, the TCU duty controls the pressure control solenoid valve 63 to operate the pressure control valve 39 such that the lines 41 and 75 are communicated.

Accordingly, the hydraulic pressure operating the servo apply 73 is exhausted through the line 77 and the 1-2 shift valve 67 to disengage the kickdown band brake 71. Further, the hydraulic pressure supplied through the communicated lines 41 and 75 passes through the lines 75 and 83, communicated via the 1-2 shift valve 67, and the low-reverse brake valve 137 to be fed to the low-reverse brake 79 to operate the same, realizing shifting into a first speed of the low L range.

(N-R Shifting)

Figure 9:
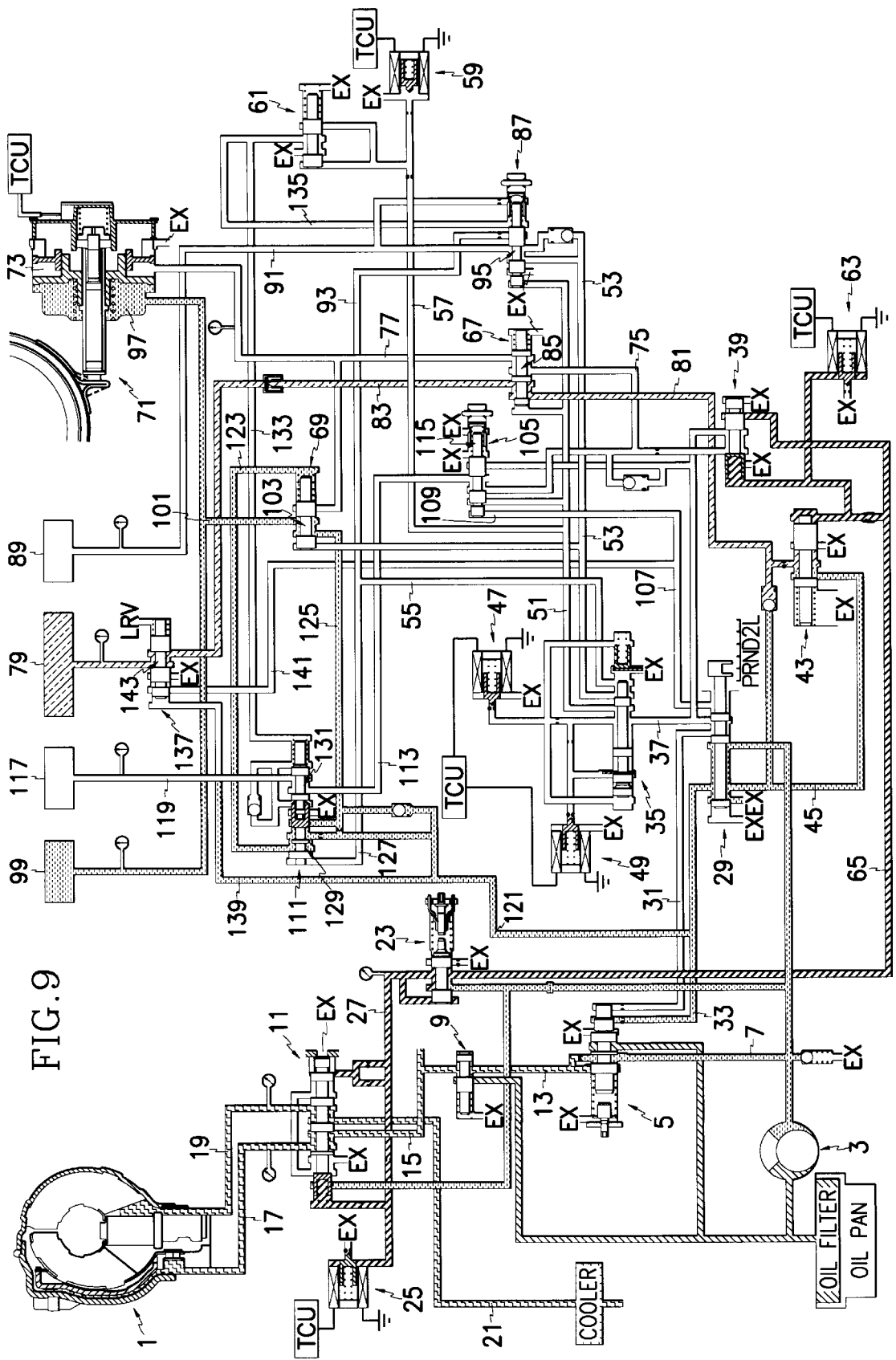
FIG. 9 is a hydraulic circuit diagram (during N-R shifting) of a hydraulic control system according to a preferred embodiment of the present invention.

In the neutral N range, if the shift select lever is positioned by the user at the reverse R range, control is realized as shown in FIG. 9. Namely, the manual valve 29 realizes port conversion such that hydraulic pressure supplied to the line pressure passage 7 is fed to the lines 33 and 45.

Accordingly, hydraulic pressure supplied to the line 121, branched off from the line 33, moves the first valve spool 129 of the first rear clutch valve 111 to the left such that the hydraulic pressure is supplied to the line 123, and moves the valve spool 103 of the 2-3/4-3 shift valve 69 to the left to communicate the lines 125 and 101.

As a result of the above, hydraulic pressure supplied to the line 125, branched off from the line 121, is fed to the servo release 97 and the front clutch 99 via the 2-3/4-3 shift valve 69 and the line 101 to disengage the kickdown band brake 71 and operate the front clutch 99.

Also, hydraulic pressure supplied to the line 139, branched off from the line 121, moves the valve spool 143 of the low-reverse brake valve 137 to the right such that the line 83 and the low-reverse brake 79 are communicated.

Here, the TCU duty controls the pressure control solenoid valve 63 to operate the N-R control valve 43, resulting in communicating the lines 45 and 81.

The hydraulic pressure supplied to the line 81 moves the valve spool 85 of the 1-2 shift valve 67 to the right to be fed to the low-reverse brake 79, via the line 83 and the low-reverse brake valve 137, to operate the same.

In the hydraulic control system for automatic transmissions structured and operating as in the above, when shifting into the drive D range after reversing in the reverse R range, as control is performed into the D2 creep state, passing through D1, shift shock is reduced.

Further, as the timing of operation of the rear clutch and end clutch are controlled by the second rear clutch valve and the end clutch valve, both controlled by solenoid valves, shift shock is reduced and shift responsiveness is improved when 2-3-4 and 4-3-2 shifting.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for an automatic transmission including a plurality of friction elements associated with respective transmission speeds, the hydraulic control system comprising:

a hydraulic fluid source;

line pressure control means for regulating hydraulic pressure supplied from the fluid source to line pressure;

reducing pressure control means for reducing hydraulic pressure from the line pressure control means;

range control means for selectively supplying hydraulic pressure from the line pressure control means;

shift control means for supplying hydraulic pressure from the range control means to lines corresponding to the respective transmission speeds by control of a transmission control unit;

hydraulic pressure control means for converting hydraulic pressure from the range control means to operational pressure operating the friction elements; and hydraulic pressure distributing means for determining a hydraulic flow path corresponding to the respective transmission speeds according to the hydraulic pressure from the shift control means, and suitably distributing the operational pressure to each friction element;

wherein the hydraulic pressure distributing means further comprises:

an end clutch valve supplying operational pressure to an end clutch;

a low-reverse brake valve supplying operational pressure to a low-reverse brake, the low-reverse brake valve comprising a port for supplying hydraulic pressure to a low-reverse brake, a port hydraulic pressure from the 1-2 shift valve to the low-reverse brake; and a port for hydraulic pressure from the range control means to control a valve spool of the low-reverse brake valve;

a first rear clutch valve supplying operational pressure to a rear clutch;

a second rear clutch valve supplying hydraulic pressure to friction elements operating when 1-2 shifting; and a 2-3/4-3 shift valve supplying hydraulic pressure to friction elements operating when 2-3 and 4-3 shifting.

2. The hydraulic control system of claim 1, wherein the shift control means comprises a first shift control valve controlling hydraulic pressure supplied from the range control means to second, third, and fourth speed pressures; a second shift control valve additionally supplying the hydraulic pressure supplied from the range control means to the hydraulic pressure distributing means to control timing of hydraulic pressure from the hydraulic pressure distributing means to each friction element and to reduce variations in hydraulic pressure levels; and a solenoid valve controlling the second shift control valve according to control from a transmission control unit.

3. The hydraulic control system of claim 1, wherein the second rear clutch valve comprises a port communicating with the first rear clutch valve to receive hydraulic pressure from the same, a port for receiving hydraulic pressure from the hydraulic pressure control means, and a port communicating with the range control means to receive hydraulic pressure for operating a valve spool of the second rear clutch valve.

4. The hydraulic control system of claim 2, wherein the second shift control valve comprises a port receiving hydraulic pressure from the first shift control valve, a port receiving hydraulic pressure from the range control means, and a port communicating with the solenoid valve controlling the second shift control valve, and which receives hydraulic pressure to control a valve spool of the second shift control vavle.

* * * * *